UNITED STATES PATENT OFFICE.

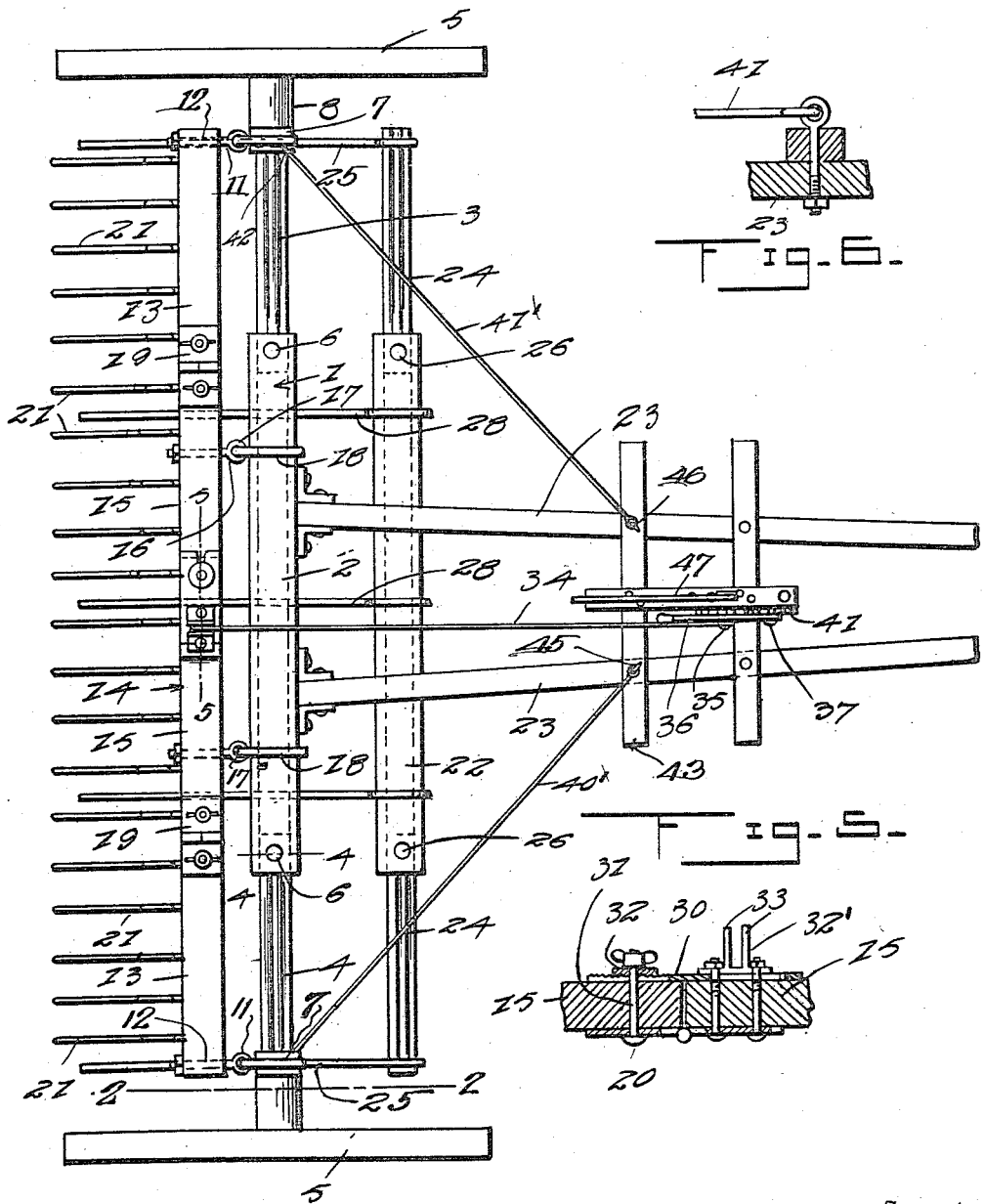

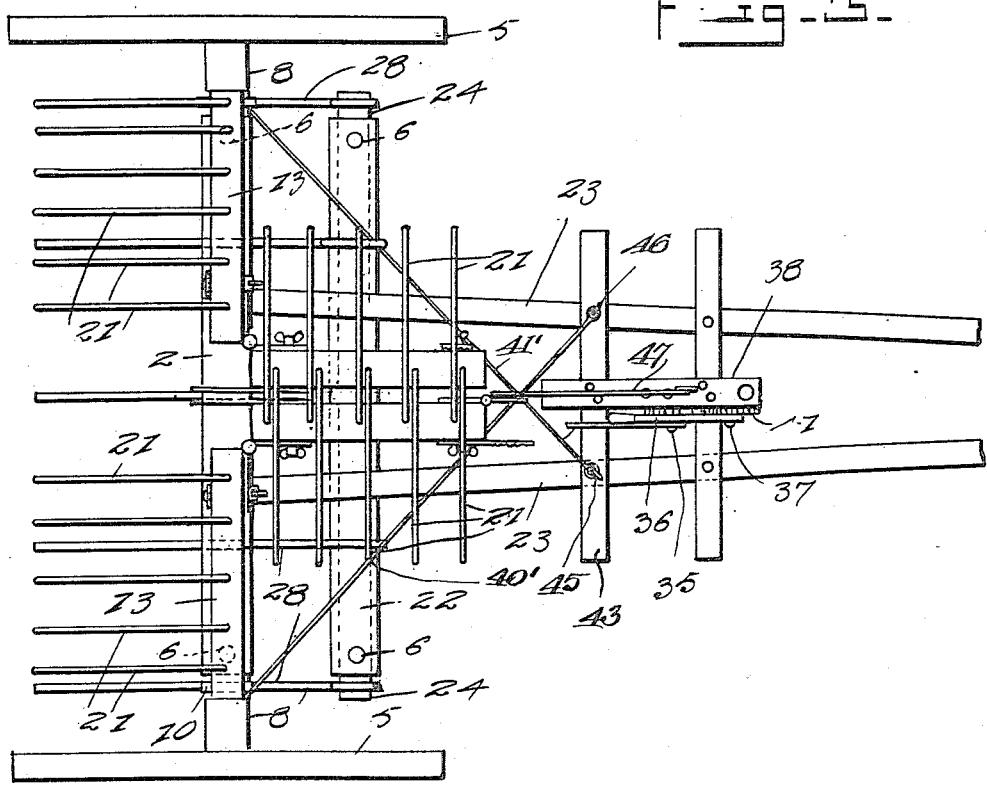
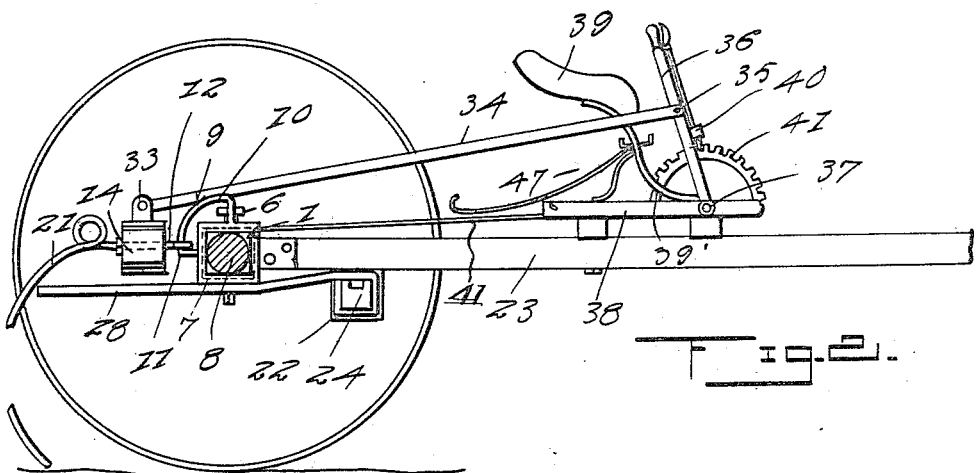

WILLIAM I. GOSSUM, OF SOUTH FULTON, TENNESSEE.

HAY-RAKE.

1,265,649.      Specification of Letters Patent.      Patented May 7, 1918.

Application filed July 12, 1916. Serial No. 108,888.

*To all whom it may concern:*

Be it known that I, WILLIAM I. GOSSUM, a citizen of the United States, residing at South Fulton, in the county of Obion and State of Tennessee, have invented certain new and useful Improvements in Hay-Rakes; and I do hereby declare the following to be a full, clear, and exact description of the invention, such as will enable others skilled in the art to which it appertains to make and use the same.

This invention relates to hay rakes, and the primary object of this invention is to provide a collapsible or folding hay rake, which may be folded for decreasing the width of the rake, when it is desired to drive along a road or highway with the rake, and when it is desired to use the rake for raking hay or the like, the raking portion of the same may be extended.

A further object of this invention is to provide in a rake structure, a raking teeth carrying bar which is composed of a plurality of hingedly connected sections, adapted for alining with each other when the rake is in an extended position, and for having the intermediate hinged sections folded forwardly over the supporting structure of the rake when it is desired to collapse or reduce the width of the entire rake.

A further object of this invention is to provide an axle structure which includes a sleeve and a pair of stub axles telescopically mounted within the sleeve, so that the length of the axle may be varied in accordance with the width of the hay rake.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawing wherein like characters designate like and corresponding parts throughout the several views, and in which:—

Figure 1 is a top plan view of the improved rake.

Fig. 2 is a cross section taken on the line 2—2 of Fig. 1.

Fig. 3 is a plan view of the rake showing the same in its folded or collapsed position.

Fig. 4 is a section on the line 4—4 of Fig. 1, and

Fig. 5 is a section on the line 5—5 of Fig. 1.

Fig. 6 is a fragmentary sectional view of a part of the hay rake construction.

Referring more particularly to the drawings, 1 designates the axle structure of the hay rake as an entirety, which includes a sleeve 2 and auxiliary axles 3 and 4 which are telescopically mounted in the ends of the sleeve 2 and have the usual type of hay rake supporting wheels 5 mounted upon their outer ends. The sections or stub axles 3 and 4 are held in adjusted telescoping positions within the sleeve 2 by means of set screws 6 which extend through the sleeve and engage the auxiliary axles 3 and 4. The auxiliary axles 3 and 4 and the casing 2 are preferably rectangular shaped in cross section and have spindles (not shown) formed upon their outer ends upon which the supporting wheels 5 are mounted.

The auxiliary axles 3 and 4 have rectangular collars 7 mounted thereon inwardly of the spindle ends 8. The rectangular collars 7 have rods 9 connected thereto which rods are bowed as shown at 10, to form substantially a quarter segment of a circle. Eyes 11 of eye bolts 12 are slidably mounted upon the bowed portion of the rods 9 and the eye bolts extend through the outer end of the outer sections 13 of the rake teeth carrying bar 14. The inner sections 15 of the rake teeth carrying bar are connected to the sleeve 2 through the medium of eye bolts 16, the eyes 17 of which are slidably mounted upon the bowed portion of rods 18, which rods are in turn connected to the sleeve 2 in any suitable manner.

The inner ends of the outer sections 13 are hingedly connected to the outer ends of the inner sections 15 by hinges 19 which are secured to the upper surfaces of the bars while the inner meeting ends of the inner sections 15 are hingedly connected by means of a hinge 20 which rests against the under surfaces of the intermediate or center bars or sections so as to permit these sections to be folded forwardly substantially parallel to each other, as clearly shown in Fig. 3 of the drawings. The sections 15 and 13 have the ordinary type of rake teeth 21 carried thereby. A sleeve 22 is supported by the spaced side bars 23 of the tongue structure of the hay rake forwardly of the sleeve 2 and it has rods 24 telescopically mounted in the ends of the same which are connected to the auxiliary axles 3 and 4 by bracing bars 25. Set screws 26 are provided for holding the rods 24 in various adjusted telescoping positions. A plurality of cleaning tines 28 are carried by the sleeve 22 and the rods 24. The cleaning tines 28 extend rearwardly between certain of the rake teeth 21, and they are provided for preventing the accumulation of hay upon the teeth as is ordinary in the construction of hay rakes of this nature.

A locking plate 30 is carried by the upper surface of the inner end of one of the intermediate sections 15, and it is connected through the medium of bolt 31 and wing nut 32 to the other intermediate section for preventing the accidental hinged movement of these sections during the operation of the rake.

A plate 32' is attached to one end of the locking plate 30 and it has upstanding ears 33 carried thereby to which a rod 34 is pivotally connected. The rod 34 is also pivotally connected as shown at 35 to a hand lever 36 which is pivotally connected as shown at 37 to an auxiliary supporting structure 38. The auxiliary supporting structure 38 is carried by the tongue structure 23 and it supports a seat 39 of the ordinary construction. The hand lever 36 has a dog mechanism 40 carried thereby which coacts with a quadrant 41 for holding the hand lever in various adjusted positions. The hand lever 36 is provided for tilting the rake teeth carrying bar 14 for dumping the hay raked by the teeth 21 and during this dumping operation, the eyes 11 and 17 of the eye bolts 12 and 16 respectively ride over the arched portions of the rods 9 and 18.

When it is desired to drive along a highway or road with the rake, and it is necessary to reduce the width of the rake, the bar 34 is disconnected from the ears 33 and the wing nuts 32 are loosened for permitting of the disconnection between the locking plate 30 and one of the sections 15, after which the set screws 6 and 26 are loosened, and the rake is folded into the position illustrated in Fig. 3 of the drawings, at which time the two intermediate portions 15 of the rake teeth carrying bar 14 extend forwardly substantially parallel to each other, and the auxiliary axles 3 and 4 are telescopically mounted in the sleeve 2, while the rods 24 are telescoped in the sleeve 22. When the rake is to be folded the hinge 20, which connects the inner end of the inner section 15 of the rake, is disconnected, so as to allow the two inner sections to assume the proper position when the rake is folded.

Braces 40' and 41' are connected to collars 7, which are mounted upon the axle 4, and they are connected to a cross piece 43 attached to the tongue structure 23. When the rake is in an extended position, as shown in Fig. 1 of the drawings, the braces 40' and 41' are connected to the cross bar 43 at the points 45 and 46, respectively, by means of eye bolts, or any analogous fastening pieces, and when the rake is in a folded position, as shown in Fig. 3 of the drawings, the brace bar 40 is connected to the bar 43 at the point 46, while the bar 41 is connected to the bar 43 at the point 45, causing the brace bars to be crossed intermediate their ends.

A hook 47 is attached to the supporting standard 39' of the seat 39, and it is provided for receiving the innermost of the tines or raking teeth 21 carried by the inner section 15 when the rake is in folded position.

From the foregoing description taken in connection with the accompanying drawings, the advantages of construction and of the method of operation of the improved hay rake will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

A rake comprising a hollow rectangular member, axles telescopic in the ends of said member, means holding the axles in adjusted position, wheels journaled on said axles, a tooth supporting bar consisting of a pair of intermediate sections and outer sections and said sections normally extending parallel with the axles and member, means pivoting the sections to the axles, teeth secured to said sections, hinges secured to the forward faces of the inner ends of the outer sections and to the outer ends of the intermediate sections, a hinge secured to the rear face of the inner end of the intermediate section, said hinges permitting the intermediate sections to be swung forwardly in parallel relation and simultaneously moving the outer sections in the direction of each other, means holding the intermediate sections against movement when parallel with the member, a telescopic member secured to the axles and member and forwardly thereof and adapted to support the intermediate sections when in a folded position, and cleaning tines carried by the telescopic member.

In testimony whereof I affix my signature in presence of two witnesses.

WILLIAM I. GOSSUM.

Witnesses:
C. J. BLACK,
C. E. HUTCHENS.

Copies of this patent may be obtained for five cents each, by addressing the "Commissioner of Patents, Washington, D. C."